Oct. 21, 1969  J. S. DIETRICH  3,473,789
MIXING DEVICE
Filed Nov. 30, 1967
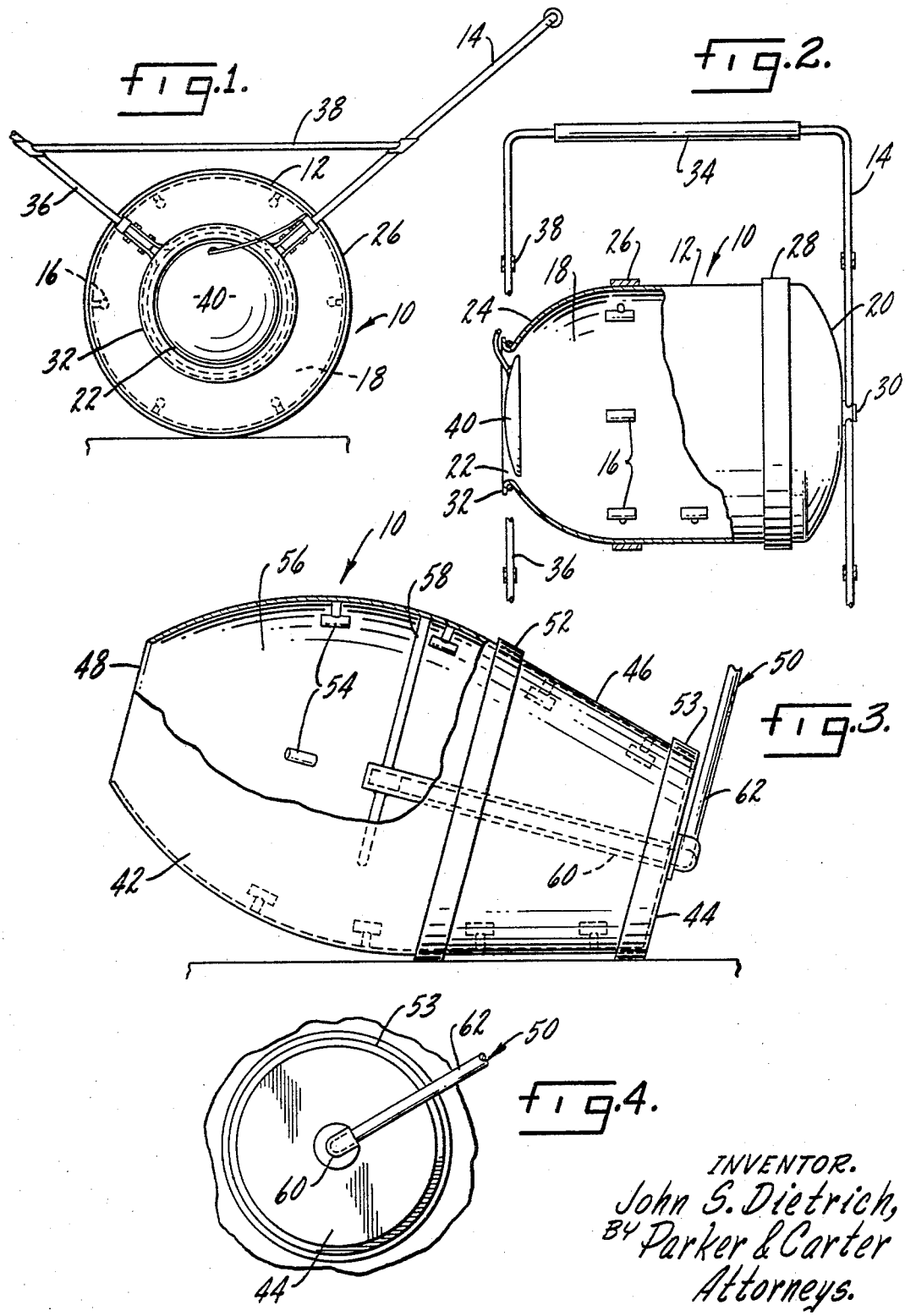
INVENTOR.
John S. Dietrich,
BY Parker & Carter
Attorneys.

3,473,789
MIXING DEVICE
John S. Dietrich, 15 Brian Crescent,
Ottawa 6, Ontario, Canada
Filed Nov. 30, 1967, Ser. No. 686,877
Int. Cl. B28c 5/22
U.S. Cl. 259—175                                      9 Claims

ABSTRACT OF THE DISCLOSURE

A mixing device for manually preparing and mixing ingredients such as cement, aggregate and water, said device including a hollow container or drum closed at one end and open at the other end having a plurality of mixing paddles mounted within the container. A handle or lever means is attached to the container and is adapted to push or pull the container along a surface causing it to rotate and mix the ingredients therein. In addition, at least one band or ring is mounted around the external surface of the container to provide a riding surface for the container when moved by the handle means.

---

This invention relates to a mixing device, and more particularly to a device for preparing and mixing relatively small quantities of materials such as concrete by hand.

Accordingly, a primary object of this invention is an improved device which permits concrete or similar materials to be manually prepared in a small compact container or drum.

A further object of this invention is a mixing device which is adapted to be pushed or pulled by hand thereby revolving and mixing the ingredients inside the drum.

Another object is an efficient mixing device which rapidly mixes small quantities of materials such as cement, aggregate and water without spilling any of the ingredients during the mixing process.

Another object is a mixing device which is constructed so that the mixed ingredients may be dumped or deposited by hand at the desired location.

Another object is a mixing device which has a sturdy construction, is light in weight and easy to handle.

Other objects and advantages will be apparent from time to time in the ensuing specification and drawings in which:

FIGURE 1 is an end elevation view of a preferred embodiment of this invention;

FIGURE 2 is a side elevation view of the embodiment shown in FIGURE 1 with parts in section;

FIGURE 3 is a side elevation of another preferred embodiment of this invention with parts in section, and FIGURE 4 is a partial end view of the embodiment shown in FIGURE 3.

Referring to the drawings in more detail it will be seen that this invention consists of improvements in a mixing device 10 for preparing and mixing ingredients such as concrete by hand. The mixing device includes an open-ended container or mixing drum 12 having a plurality of internally mounted mixing paddles 16 within the container. In addition, a handle means 14 is attached to the container 12 for pushing or pulling the device along a surface to rotate and mix the ingredients within the container.

FIGURES 1 and 2 show a preferred embodiment of this invention wherein the container or drum 12 is substantially cylindrical in shape. As shown in these figures the container 12 is preferably hollow forming an internal chamber 18 wherein the ingredients are mixed. The size or capacity of the chamber 18 may vary, but preferably ranges from one gallon to one cubic yard.

As shown in FIGURES 1 and 2 the container 12 is closed at one end 20 and open at the other end 22 to allow the ingredients to be placed in and removed from the container with ease. The open end 22 of the container or drum is preferably beveled or curved as at 24 to facilitate emptying allowing the container to be tilted when pouring the contents out of the drum.

On the inside wall of the container 12 a plurality of mixing paddles 16 may be mounted to facilitate mixing the ingredients within the chamber 18. As the container or drum is rolled along a surface, the ingredients fall off the rotating walls of the chamber 18 and hit the paddles 16 thereby mixing the ingredients.

Mounted around the external surface of the container 12 is a means on which the container will ride when moved forward or backward. This means preferably consists of at least one encircling band or ring and is shown in FIGURES 1 and 2 as two rings 26 and 28 extending around the outside surface of the container. As the container is pushed or pulled along the ground or floor, the container will ride and revolve on the two rings 26 and 28.

Attached to the container or mixing drum 12 is a handle means 14. It is important that the handle means 14 is attached to the container in such a manner as to allow the container to freely rotate when either pushing or pulling the device. One preferred way to accomplish this result is shown in FIGURES 1 and 2 wherein a bearing means 30 supports the handle means 14 at the closed end of the container and allows it to freely turn therein. At the open end 22 the container is preferably flanged as at 32 to receive the other end of the handle means 14 in rotatable relationship.

The handle means 14 is sturdily constructed and preferably extends substantially parallel to the lengthwise portion of the container 12. The lengthwise or longitudinal portion of the handle means 14 preferably includes a gripping means 34 to facilitate either moving or lifting the container portion of the device.

In the embodiment shown in FIGURES 1 and 2 an additional handle means 36 may be available as an option. The second handle means 36 is identical to the first described handle means 14 except that it extends outwardly to the other side of the container.

The two handle means 14 and 36 would preferably be connected or joined together by a connector as shown at 38. The connector would hold the two handle means 14 and 36 apart at an advantageous angle while providing a handle means for both sides of the container. The two handle means 14 and 36 would enable two men to stand on either side of the mixing device 10 to lift it when pouring the mixed ingredients out of the container.

In addition, a deflector arm 40 may be mounted at the open end of the container 12 for deflecting the mixing ingredients away from the open end of the container. The deflector arm 40 may be fastened or clamped to either handle means and extends into the opening at the open end of the container. As the materials are mixed some of them will move toward the open end 22 hitting the deflector arm 40 and thereby deflecting away from the opening.

FIGURES 3 and 4 show another embodiment of this invention wherein the container or mixing drum 42 is barrel-shaped. One of the important features of this embodiment is that the closed end 44 of the container is angled or curved as at 46 to raise the open end 48 above the ground or floor when the handle means 50 is at rest.

The size or capacity of this embodiment may vary but is generally smaller than the embodiment shown in FIGURES 1 and 2. For instance, the capacity of the barrel-shaped container 42 generally varies from one pint to four gallons, however, as was true with the first embodiment these limits are merely suggestive and not restrictive.

Mounted around the external surface of the barrel-shaped container 42 are rings or bands 52 and 53 on which the container will ride when pushed or pulled along a surface such as the ground or floor. It is important to note that one of the rings or bands 52 encircles the barrel-shaped container 42 substantially at the loaded point balance thereby providing a smooth riding surface for the container.

As in the embodiment shown in FIGURES 1 and 2, the inside wall of the container 42 may have a plurality of mixing paddles 54 to facilitate mixing the ingredients within the chamber 56.

In addition, the chamber 56 may have a support 58 which receives a portion of the handle means 50 as shown in FIGURE 3. The handle means 50 may include a hollow tube 60 which extends through an opening in the closed end 44 of the container. A shaft or rod 62 extends into the hollow tube 60 which allows free rotation of the container when moved along a surface. Although not shown in FIGURES 3 or 4 the shaft or rod is shaped to form a handle means adapted to push or pull the container. In addition, both the hollow tube 60 and shaft 62 are of sufficient strength to allow the container to be tilted or lifted when emptying the device. It is also important to note that the support 58 gives added strength to the container, however, it is not necessary as the shaft 62 may be held in place by a cap or other means not shown.

The use, operation and function of this invention are as follows:

This invention may be used to prepare and mix a variety of ingredients, but will primarily be used to mix cement, aggregate and water to form wet concrete. Because the invention has a relatively small capacity and is easy to operate, it will be used primarily where small quantities of concrete are prepared by hand. For instance, homeowners or the military or people in underdeveloped areas not easily serviced by ready-mixed concrete trucks will find this invention extremely useful.

When using this invention the ingredients to be mixed are first placed within the chamber portion 18 or 56 of the container. The container 12 or 42 is then pushed or pulled by the handle means 14, 36 or 50 along a surface such as the floor or ground. The rotating motion of the container will mix the ingredients within the chamber and when thoroughly mixed, they will be dumped or deposited at the desired location. A separate support frame or trestle may be provided to facilitate dumping the ingredients into a raised receptacle such as a wheelbarrow. The mixing device 10 may be rolled onto the support frame thereby lifting the device above the ground to facilitate emptying the container.

The container 12 or 42 for this invention is watertight, and may be made from any number of different materials including steel, aluminum or plastic. The bands or rings 26, 28 or 52 extending around the exterior surface of the container may also be made from any number of different materials such as rubber, plastic or metal. It is also important that the handle means 14, 36 or 50 for this invention be made from a material or materials of sufficient strength to withstand pressures and forces due to unloading the device.

I claim:

1. A mixing device for preparing and mixing ingredients by hand, said device including a generally cylindrical rotatable mixing container closed at one end and open at the other end for receiving or delivering mixable ingredients, rolling areas on the exterior of said container for rotation thereof on a surface, a handle extending from the open end of the container to the closed end thereof for imparting rolling rotation to the container to mix ingredients placed therein, a collar on the open end of the container, a ring rotatably positioned in said collar, and the handle being secured at one end to said ring and pivotally secured at its other end to the closed end of the container.

2. The structure of claim 1 further characterized in that the open end of said container is bevelled to facilitate control of the rate of pouring of the ingredients out of said container.

3. The structure of claim 1 further characterized in that the external surface of said container comprises at least one encircling band on which said container will ride when rolled along a surface.

4. The structure of claim 3 further characterized in that one of said encircling bands is mounted around the external surface of said container substantially at the loaded point of balance on which said container will ride when moved along a surface.

5. The structure of claim 1 especially adapted for two-man operation and further characterized by including a second handle means on the other side of said container to facilitate lifting and moving said container, and pouring out the mixed ingredients.

6. The structure of claim 1 further characterized in that a plurality of mixing paddles are mounted within said chamber to facilitate mixing the ingredients.

7. The structure of claim 1 further characterized and including a deflector arm mounted at the open end of said container for deflecting the mixed ingredients away from the open end of said container.

8. The structure of claim 1 when the cylindrical surface of the container in the vicinity of the closed end is generally conical decreasing in diameter towards the closed end, providing a rolling unit wherein the axis of rotation when loaded is at an angle to the horizontal, with the apertured end of the container elevated.

9. A mixing device for preparing and mixing ingredients by hand, said device including:
a generally cylindrical rotatable mixing container,
said container being closed at one end and apertured at the other end for receiving and delivering the ingredients to be mixed,
means mounted around the external surface of said container on which said container will roll,
handle means for moving said device thereby causing said container to rotate and mix the ingredients within said chamber, and
said container further comprising a deflector arm mounted at the open end of said container for deflecting the mixed ingredients away from the open end of said container.

References Cited
UNITED STATES PATENTS

| 1,165,905 | 12/1915 | Reimann | 259—176 |
| 1,307,803 | 6/1919 | Shero | 259—176 |
| 1,323,434 | 12/1919 | Henry | 259—176 |
| 3,389,893 | 6/1968 | Arcuri | 259—176 X |

ROBERT W. JENKINS, Primary Examiner